United States Patent

[11] 3,530,830

| | | | |
|---|---|---|---|
| [72] | Inventor | Bruce L. Smith,<br>9555 School St.,<br>Elk Grove, Calif. 95624 | |
| [21] | Appl. No. | 732,960 | |
| [22] | Filed | May 29, 1968 | |
| [45] | Patented | Sept. 29, 1970 | |

[54] LIVESTOCK SHIPPING CONTAINER
1 Claim, 9 Drawing Figs.

[52] U.S. Cl. .................................................. 119/15,
119/9, 119/10, 105/371

[51] Int. Cl. ....................................................... A01k 1/00,
B61d 3/00

[50] Field of Search .......................................... 119/7—12,
15, 18, 19, 21, 28; 105/370, 371

[56] References Cited
UNITED STATES PATENTS

| | | | |
|---|---|---|---|
| 382,843 | 5/1888 | Stiles ............................. | 119/9X |
| 452,259 | 5/1891 | Butz .............................. | 119/7 |
| 533,720 | 2/1895 | Mock ............................. | 119/10 |
| 553,855 | 2/1896 | Jenings .......................... | 105/372 |
| 718,874 | 1/1903 | Perkins .......................... | 119/7X |
| 783,855 | 2/1905 | Carson .......................... | 105/371 |
| 876,774 | 1/1908 | Crepar .......................... | 105/371 |
| 2,549,155 | 4/1951 | Ash ................................ | 119/15 |
| 2,983,251 | 5/1961 | Lingis ............................ | 119/17 |
| 3,098,465 | 7/1963 | Ivey ............................... | 119/15 |
| 3,137,270 | 6/1964 | Rigterink et al. ............. | 119/16 |

*Primary Examiner*—Aldrich F. Medbery
*Attorney*—Alexander B. Blair

ABSTRACT: A relatively large rectangular container is used for shipping livestock, such as animals and poultry, by truck, railroad car or marine vessels. Opposite sides of the shipping container are provided with vertically spaced parallel cleats secured against the side walls to selectively engage and support horizontal partitions. When the upper parallel members are used, the support extending across the container form an upper compartment in which may be arranged a bale of straw for supplying bedding to animals therebelow. When smaller animals or poultry are to be shipped, the transverse support may rest upon the lower longitudinal members to divide the containers into upper and lower compartments to increase the shipping capacity of the container.

Patented Sept. 29, 1970
3,530,830
Sheet 1 of 2
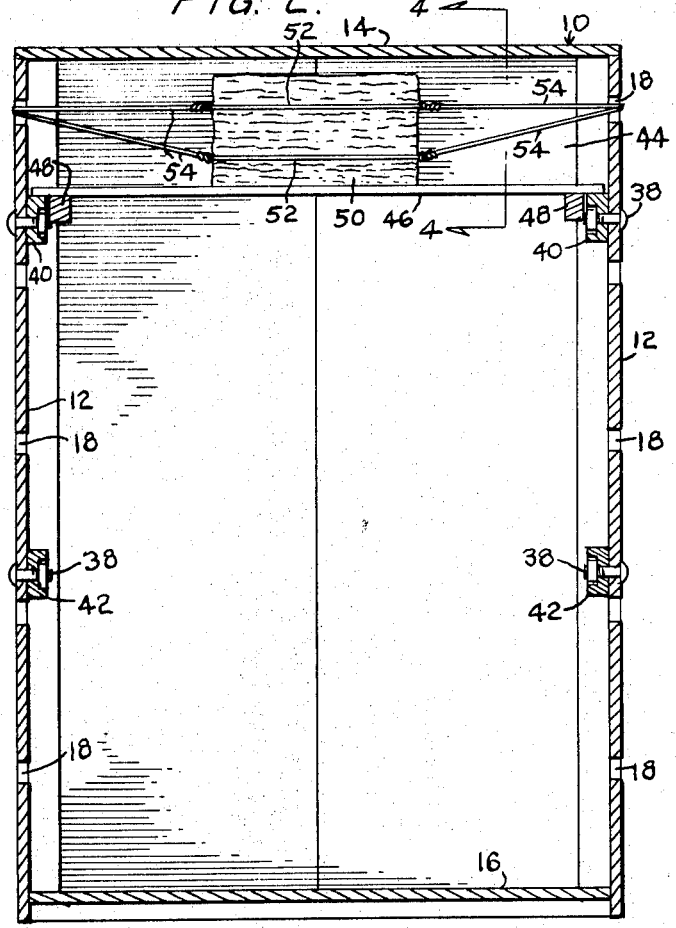
INVENTOR
BRUCE L. SMITH
BY *Alexander B. Blair*
ATTORNEY Patented Sept. 29, 1970
3,530,830
Sheet 2 of 2
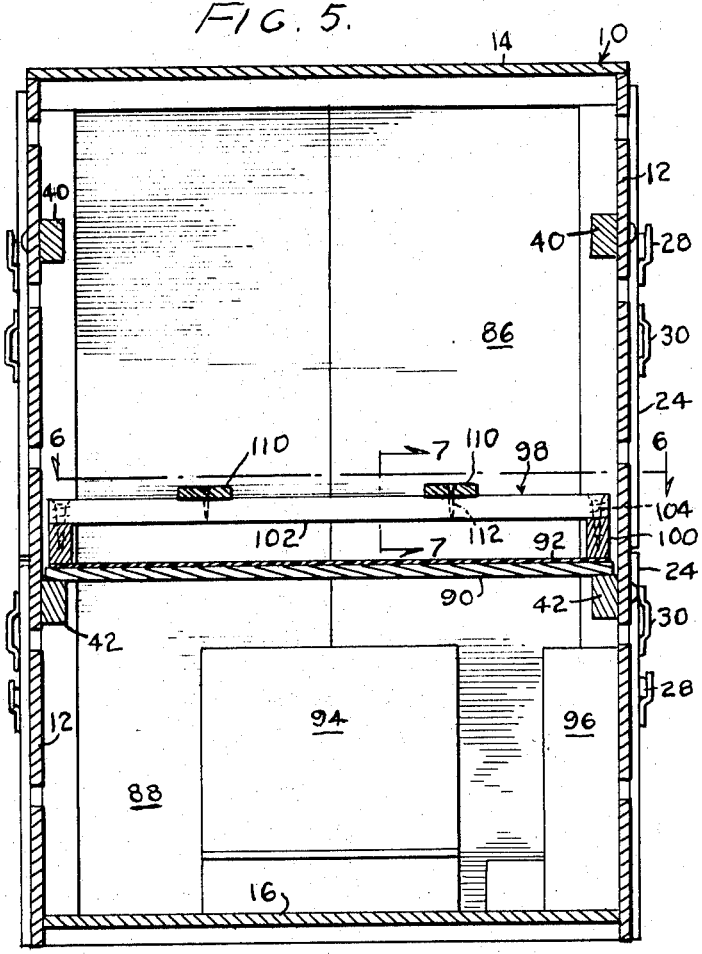
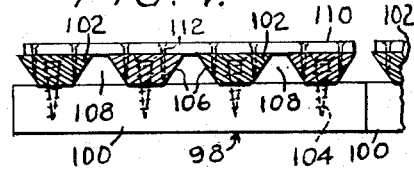
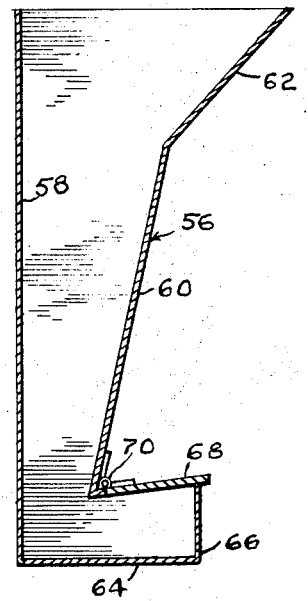
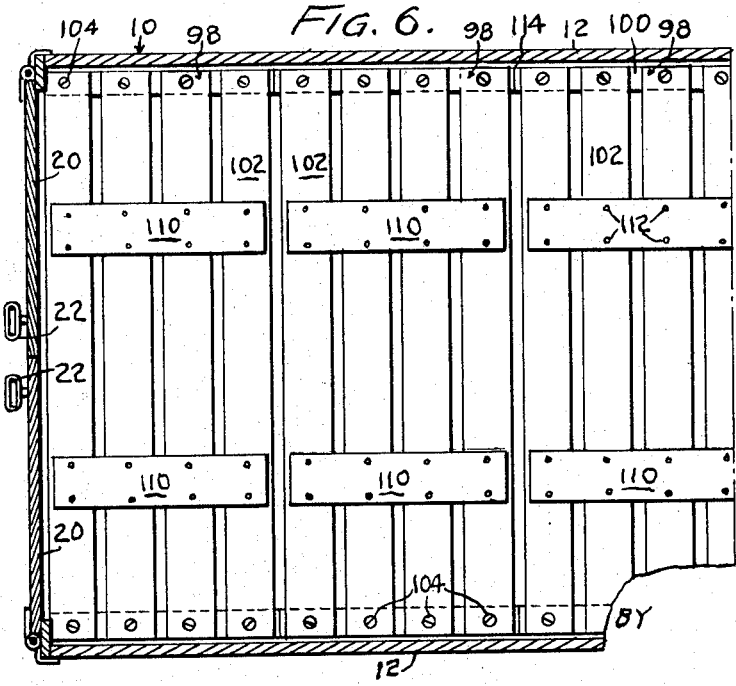
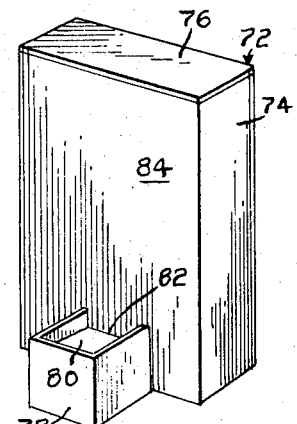
INVENTOR
BRUCE L. SMITH
Alexander B Blair
ATTORNEY 3,530,830

LIVESTOCK SHIPPING CONTAINER

BACKGROUND OF THE INVENTION

It is common practice to ship livestock in trucks, railroad cars, etc., and it is usually necessary to employ carpenters to build stalls for the animals, such procedure being relatively expensive. It is unlawful to ship animals for periods of over 36 hours without stopping for food, water and rest. It is the approved practice, especially shipping animals by sea, not to feed them the first 24 hours the animals are aboard ship. The animals are then given access to food for 24 hours after which the food is cut off for another 24 hour period. All of these procedures require a substantial amount of time by animal keepers and substantial expense is involved.

SUMMARY OF THE INVENTION

The invention comprises a relatively large rectangular shipping container of such capacity as when used for larger animals, such as horses and cattle, the animals have space to move around to secure a certain amount of exercise and to have access to food. In such use of the construction, the vertical walls are preferably provided at spaced intervals with ventilating openings, for example, three inch openings, drilled through the walls of the container. At least one end wall of the container is provided with double doors which also may be provided with ventilating openings if desired. One or both sides of the container may be provided centrally of the length thereof with so-called "Dutch" doors, that is, upper and lower vertically aligned contiguous doors capable of individual opening and closing.

The inside walls are provided with pairs of opposite horizontal stringers or cleats, preferably extending throughout the length of the container. The upper cleats are spaced from the top of the container and are adapted to support a rack for straw for bedding for animals in the container. This upper compartment is used when larger animals are being shipped, in which case the lower stringers are not used and all of the space beneath the straw rack is free for use by the animals in moving around in the container.

Where the straw rack is used, a bale of straw will be supported on the rack, which includes slats transversely of the container to support a bale of straw restrained by bailing wire in the usual manner. Wires are connected to the baling wires at opposite edges of the bale and extend through ventilating openings in the side walls to anchor the bale against transverse movement, this being particularly necessary when shipping the animals by boat to prevent the straw bale from shifting its position. These stabilizing wires serve an additional purpose. When it is desired to furnish bedding for animals beneath the straw rack, a pinch bar or other tool may be inserted through ventilating openings to break the baling wires around the straw bales to permit it to fall between the supporting slats to furnish fresh bedding for the animals. When the baling wires are thus broken, the stabilizing wires support the baling wires to prevent them from falling between the slats and possibly injuring the animals.

When small animals or poultry are to be shipped, the straw rack may be omitted and the lower horizontal cleats, which are spaced above the floor, may support means forming a floor for animals or fowl in the upper compartment provided above the intermediate floor. This floor is formed by a sheet of relatively stiff material such as plywood resting upon the lower cleats and having arranged thereon an impervious sheet of material such as a plastic sheet to prevent droppings from the upper compartment from falling through to the lower compartment. Above such sheet of material is arranged a plurality of edge-to-edge rack sections each comprising longitudinal supports at opposite sides connected by transverse slats spaced from each other and tapered to decrease in width downwardly to provide spaces through which droppings from the upper compartment may fall through to the plastic sheet. These tapered slats of each rack section are tied by longitudinal strips which reinforce them and provide means engageable by the feet of animals in the upper compartment to permit them to hold their footing, for example, when a ship is rolling.

Suitable feeding and watering means may be provided for the livestock. An ordinary feeder is provided having a hinged cover which may be closed from the outside of the container through ventilating openings when it is desired to cut off feed to the animals. Through the same ventilating openings the hinged cover of the feeder may be lifted when it is desired to allow the animals access to the feed. These various operations may be performed by a limited number of animal keepers, thus rendering the use of the container extremely economical.

The container may be used with or without wheels, and when wheels are employed to increase the mobility of the container, the bottom of the container may support a drop center compartment which may be used for small stock, such as chickens.

BRIEF DESCRIPTION OF THE DRAWING

FIG. 1 is a side elevation of the container;
FIG. 2 is a vertical section on line 2-2 of FIG. 1;
FIG. 3 is an end elevation of one end of the container;
FIG. 4 is a fragmentary detail section on line 4-4 of FIG. 2;
FIG. 5 is a vertical section similar to FIG. 2 showing the container divided to form upper and lower compartments;
FIG. 6 is a fragmentary horizontal section on line 6-6 of FIG. 5;
FIG. 7 is a detail section on line 7-7 of FIG. 5;
FIG. 8 is a vertical sectional view through an automatic feeder; and
FIG. 9 is a perspective view of an automatic watering device.

DESCRIPTION OF THE PREFERRED EMBODIMENTS

Referring to the drawings, the numeral 10 designates the container as a whole having side walls 12, a top or roof 14 and a floor 16. The side walls 12 are preferably provided at spaced intervals with ventilating openings 18 to furnish adequate air to animals in the container.

One or both ends of the container may be provided with double doors 20 having suitable operating handles 22 of such operating type that the closing of one door will lock it relative to the container, while the closing of the other door will lock it to the container or relative to the first-named door. One or both sides of the container may be provided with so-called "Dutch" doors 24 arranged in vertical alignment and in contiguous relationship, as shown in FIG. 1. These doors are hinged as at 26 to the side walls 12 and are provided with latches 28 and operating handles 30. The purpose of providing two doors will become apparent below.

To improve the mobility thereof, the container may be provided with supporting wheels 32 which space the bottom of the container from the supporting surface and thus provides space for a drop center compartment 34 shown in solid lines in FIG. 1 and in dotted lines in FIG. 3. This drop center compartment has been omitted from the other views, its use being unnecessary. Access to the compartment 34 may be provided through a suitable door 36.

Against the inner surface of the side walls 12 are secured by bolts 38 or other fastening means, upper and lower pairs of cleats 40 and 42, respectively. Assuming that the inside of the container is not to be divided horizontally so as to provide ample space for relatively large animals such as horses and cattle, the lower cleats 42 will not be used. In this case, an upper compartment 44 will be provided by transverse slats 46 secured to cleats 48 at their undersides, arranged within the cleats 40 which support the slats. These slats will be substantially spaced from each other as shown in FIG. 4 for a purpose which will become apparent. The means for providing the upper compartment 44 may be made sectional to facilitate the handling of the parts. For example, four or five of the slats 46 may be secured to their cleats 48 to form each supporting section which will be inserted through one end of the container and slid along the cleats 40.

In the upper compartment 44 will be arranged a bale of high-grade straw 50 bound by baling wires 52. The baling wires at opposite edges of the bale will be connected to the inner ends of wires 54 which may be led through one or more of the ventilating openings 18 and woven in and out of said openings and suitably made fast to anchor the bale of straw against appreciable movement on the slats 46, particularly when the container is being used at sea.

When shipping animals according to the use of the invention of FIG. 2, a bedding of straw, for example about 18" thick, will be placed on the floor 16 and ultimately will become packed down and soiled. To provide fresh bedding, a keeper will insert a pinch bar through openings 18 to break the baling wires 52, thus loosening the straw of the bale so that it can fall downwardly between the slats 46 to cover the soiled straw on the floor 16 and thus provide fresh bedding for the animals.

In one end of the container will be arranged a feeder 56 (FIGS. 1 and 8) having a back wall 58, a front wall 60 diverging from the back wall at its upper end as at 62 to provide a hopper, and bottom and end walls 64 and 66, respectively. The open top between the upper edge of the wall 66 and lower edge of the wall 60 may be closed by a cover 68 hinged as at 70 to the wall 60. The cover 68 may be closed when it is desired to deny the animals access to food, for example, during the first 24 hours of shipment. When it is desired to open the feeder, an attendant will insert a suitable implement through one of the openings 18 and lift the cover 68 so that the animals may have access to the feed.

An automatic waterer 72 (FIGS. 1 and 9) may be provided for the animals. This device comprises a vertical casing 74 having a sealed cover 76 to prevent the venting of the top of the container 74. A laterally projecting container 78 at the lower end of container 74 is open at its top to provide access to the water 80 therein. Projecting below the upper extremity of the portion 78 is a portion 82 of the front wall 84 of the waterer. This is a conventional type of waterer, and it will be apparent that when the level of the water 80 drops below the lower edge of the wall portion 82 the container 74 will be vented to allow the flow of more water into the device 78.

Where smaller animals and fowl are to be shipped, the container may be divided horizontally to form upper and lower compartments 86 and 88, respectively (FIG. 5). In this case the lower cleats will support an intermediate floor of floor sheets 90. This floor will be sectional, being made up, for example, of four feet by eight feet plywood sheets which may be slid successively along the cleats 44 through one end of the container. As these sheets are successively placed in position, a roll of flexible impervious material 92, such as flexible plastic, will be unrolled along the successive sheets 90, to prevent any droppings from the upper compartment 86 from falling through to the lower compartment. In FIG. 5 a feeder 94 and waterer 96 have been shown in the lower compartment. These devices will be substantially identical with the devices in FIGS. 8 and 9 except that they will be of smaller vertical dimensions. Similar devices may be placed in the upper compartment, such devices not being shown in FIG. 5.

On the flexible sheet 92, laying flat over the top surface of floor sheets 90, will be supported a plurality of racks, each indicated as a whole by the numeral 98, one complete rack being shown in FIG. 7. Each of these racks comprises parallel cleats 100 which may be in the form of 2 x 4's, and to the upper edges of these cleats are fixed slats 102. The slats 102 may be secured to the cleats 100 by screws or other fastening elements 104. The slats 102 have opposite edges sloping as at 106 so that the slats decrease in width downwardly to provide downwardly widening openings 108 between the slats so that droppings from the upper compartment may fall between the slats 102 without clogging the spaces therebetween. The rack sections 98 may include any desired number of slats 102, four being illustrated in FIG. 7. These slats are connected by ties 110, secured in position in any suitable manner, for example, by nails 112. These ties reinforce the slats 102 and provide means which may engage the feet of livestock in the compartments to assist them in bracing themselves against the rolling of the ship.

Several of the rack sections 98 are shown in FIG. 6. It will be noted that the ties 110 do not project beyond the limits of the racks 98. These racks are fixed in position with respect to each other to maintain spaces between the adjacent slats 102 of adjacent sections 98 by projecting the cleats 100 slightly beyond the remote edges of the remote slats 102 so that these cleats abut as at 114.

To increase the carrying capacity of the container, a suitable partition similar to the racks 98 may be arranged on the upper cleats 40 so that small stock, such as chickens, may be carried in the upper compartment. Moreover, an impervious sheet, similar to sheet 92, is also provided directly on the bottom floor 16 when pigs, goats, sheep, etc., are carried in the lower compartment. Such sheet is surmounted by racks 98 so that the animals will not stand in their own droppings. This does not apply to large animals which are provided with the usual bedding.

The animals may be walked through the doors at one end of the container, or through the doors 24. Both of these doors will be opened when a single large compartment for larger animals is provided as in FIG. 2. When the container is divided into upper and lower compartments 86 and 88, as in FIG. 5, the doors 24 may be separately opened to place smaller animals in the upper and lower compartments.

As stated, the ventilating openings 18 may be provided in the side walls as shown in FIGS. 1, 2 and 5, and if desired, ventilating openings may also be provided in the doors 20 and 24. The container also may be constructed without any ventilating openings, if desired. Tanks of oxygen or nitrogen would be provided to furnish proper and regulated air for the animal cargo particularly when the container is stored in the hold of a ship.

Thus a container may be used for carrying animal cargo anywhere on the ship instead of just on the main deck as is done at present. Of course, when carrying fowl, it will not be necessary to carry bedding in the uppermost compartment and such compartment could then be utilized for carrying additional cargo.

The nature of the invention is such that the ordinary rule that animals cannot be transported more then 36 hours without stopping for food, water and rest will not apply. The animals can be fed at any time, thus making it unnecessary to stop, and they are always provided with water. Access to feed may be provided at any time by opening the cover 68 (FIG. 8) and the container is of such capacity that animals may move around therein to a reasonable extent to provide them with the necessary exercise.

From the foregoing it will be apparent that the present construction is highly efficient for use in shipping livestock and eliminates any of the disadvantages of the present procedures in shipping such stock. No stopping is necessary to feed and rest the animals and the ease with which the animals can be cared for greatly reduces the labor necessary for their care, thus substantially reducing shipping costs.

From the foregoing it will now be seen that there is herein provided an improved Livestock Shipping Container which accomplishes all of the objects of this invention and others, including many advantages of great practical utility and commercial importance.

As various embodiments may be made of this inventive concept, and as many modifications may be made in the embodiments hereinbefore shown and described, it is to be understood that all matter herein is to be interpreted merely as illustrative, and not in a limiting sense.

I claim:

1. A multifunction shipping container comprising top and bottom walls, end walls, spaced parallel vertical side walls having spaced ventilating apertures, a plurality of stringers connected to the side walls, a plurality of slatted rack sections extending horizontally transversely of the container and supported on at least two of said stringers, first means secured to said rack sections for maintaining fresh bedding for large animals obviating the conventional procedure of supplying new bedding from outside the container and of having to stop travel in order to supply the bedding, second means secured to the container for allowing the simultaneous loading, housing, and shipping of both large and small animals in the same containers, third means mounted within the container for converting the space occupied by said first means into housing for small animals, fourth means mounted within the container for converting all the space occupied by the large animals into a plurality of horizontal compartments for housing small animals, and fifth means mounted in the container for shipping both small and large animals for long durations of travelling time obviating conventional rest periods for food and water, wherein:

said first means comprises parallel cleats secured to the undersides of the slats of each of said rack sections connecting the slats adjacent their ends, said cleats positioned adjacent the side edges of an upper pair of said stringers for preventing slippage during travel, bailing wires extending horizontally around and binding a bale of straw, the slats of said rack sections supporting the bale of straw being widely spaced, and stabilizing wires connected to the baling wires and extending through certain of said ventilating apertures to stabilize the straw bale against movement transversely of the container and to support the bailing wires when the latter are broken to permit straw to sift downwardly between the slats of said rack sections, straw falling downward only after an implement inserted through one of said spaces cuts some of the bailing wires;

said second means comprises wheels attached below the container at both ends thereof, a horizontal compartment mounted at the bottom of the container between said wheels, a hinged door mounted to said compartment, and hinged doors mounted at one end of the container for allowing large animals to enter the space within the container between the top of said compartment and the bottom of said first means;

said third means comprises floor sheets arranged with their ends in abutting relationship and supported by said upper pair of stringers, said slatted sections having the cleats thereof resting on said floor sheets, a flexible sheet of impervious material arranged over said floor sheets and on which said cleats of said rack sections rest, the slats of said rack sections each having its side edges sloping downwardly toward each other to provide downwardly diverging spaces between adjacent slats of such sections to prevent droppings from clogging up the spaces between said slats; and said fifth means comprises a watering device and a feeder device mounted within each compartment of said container housing animals, said feeder having a hinged cover which may be closed from the outside of the container through said ventilating apertures when it is desirable to alternatively feed and cut off feed to the animals.